Dec. 14, 1965   R. C. GEITZ   3,223,492
PRESSURE VESSEL
Filed Nov. 14, 1960   5 Sheets-Sheet 1
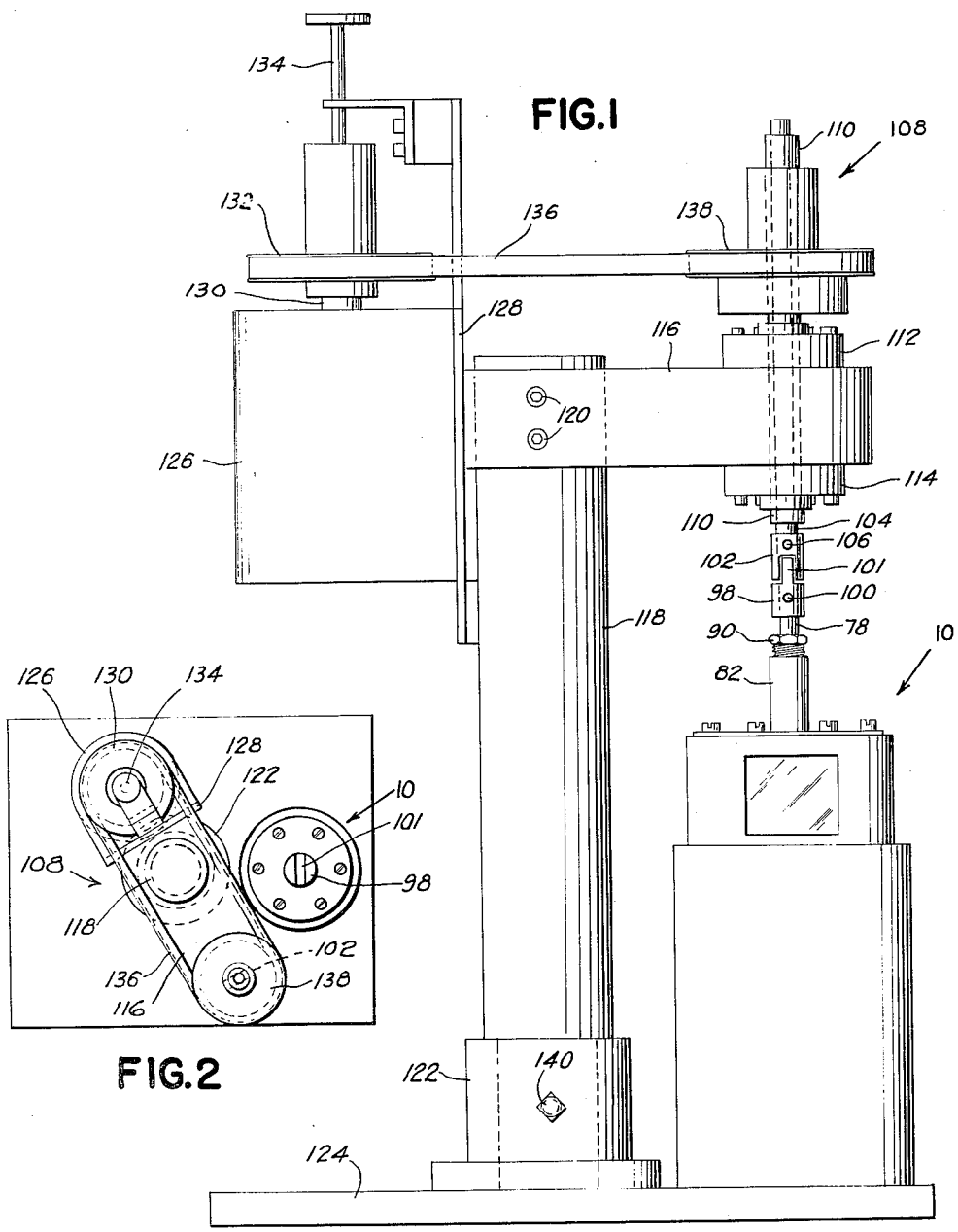
INVENTOR.
Robert C. Geitz
BY Robert R. Churchill
ATTORNEY

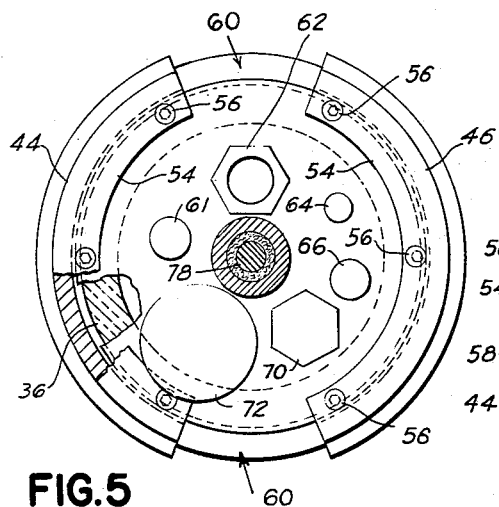
FIG.5
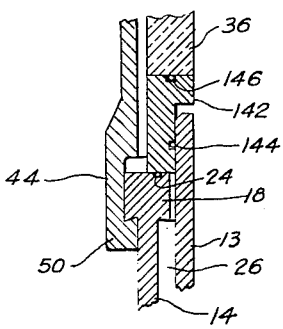
FIG.6
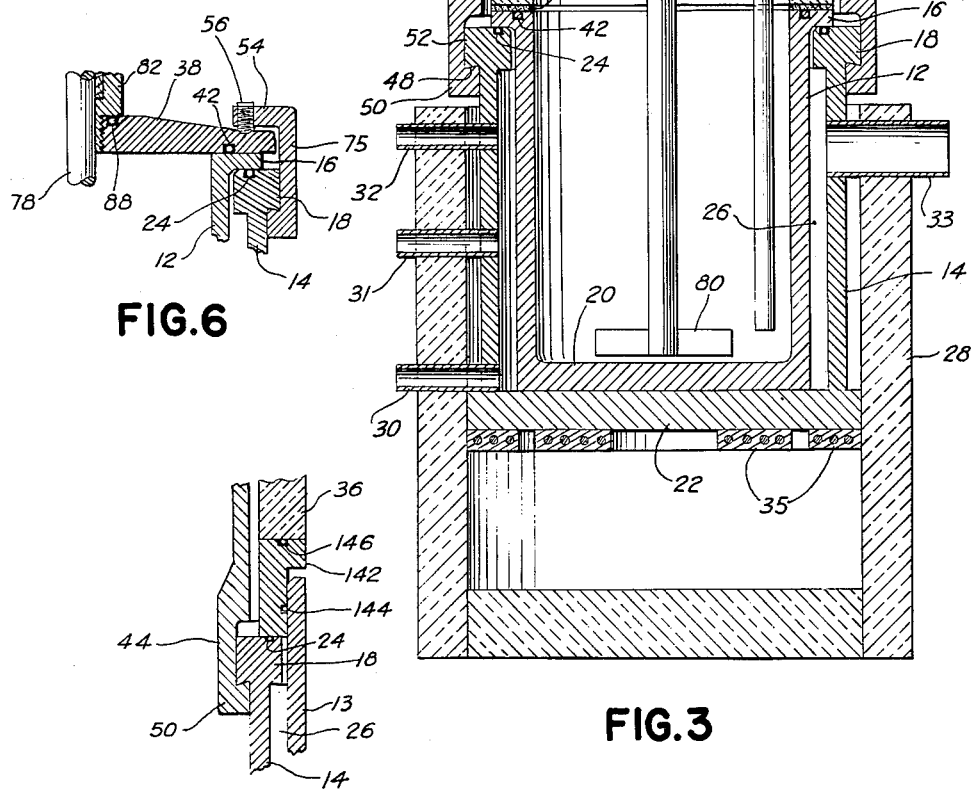
FIG.4
FIG.3
INVENTOR.
Robert C. Geitz
BY Robert R. Churchill
ATTORNEY INVENTOR.
Robert C. Geitz
BY Robert R. Churchill
ATTORNEY Dec. 14, 1965    R. C. GEITZ    3,223,492
PRESSURE VESSEL Filed Nov. 14, 1960    5 Sheets-Sheet 5

INVENTOR.
Robert C. Geitz
BY
Robert C. Churchill
ATTORNEY

United States Patent Office 3,223,492
Patented Dec. 14, 1965

3,223,492
PRESSURE VESSEL
Robert C. Geitz, 21 Mayflower Road, Noroton, Conn.
Filed Nov. 14, 1960, Ser. No. 69,169
13 Claims. (Cl. 23—290)

This invention relates to laboratory apparatus and more particularly to a reactor unit for use in a chemical laboratory.

The invention has for an object to provide a novel and improved reactor unit adapted for universal use in conducting chemical investigations and experimentation, and which is characterized by novel structure enabling the reactor vessel to be easily and conveniently heated, cooled and cleaned in a novel and efficient manner.

A further object of the invention is to provide a novel and improved reactor unit of the character specified which may be easily and quickly assembled and disassembled to provide a pressure vessel particularly adapted to be used for performing chemical experiments requiring high pressures.

Another object of the invention is to provide a novel and improved metal reactor unit of the character specified which is adapted for use as a pressure vessel and which is further characterized by novel provision enabling the experimenter to view the reaction taking place in the vessel.

A still further object of the invention is to provide a novel and improved reactor unit for use in a chemical laboratory wherein novel provision is made for agitating the contents of the reactor unit and which is characterized by ease of connecting and disconnecting the agitating mechanism in a manner such as to facilitate disassembly of the reactor unit and removal of the reactor vessel in a simple and convenient manner.

With these general objects in view and such others as may hereinafter appear the invention consists in the laboratory apparatus and in the various structures, arrangements and combinations of parts hereinafter described and particularly defined in the claims at the end of this specification.

In the drawings illustrating the preferred embodiments of the invention:

FIG. 1 is a side elevation of laboratory apparatus embodying the present reactor unit;

FIG. 2 is a plan view of the same at a smaller scale showing the agitator driving mechanism in an inoperative position;

FIG. 3 is a vertical cross sectional view of a laboratory reactor unit embodying the present invention and showing a tubular glass viewing member clamped between the cover and the reactor vessel;

FIG. 4 is a detail view in cross section illustrating a modified joint sealing structure for the reactor unit shown in FIG. 3 adapted to permit relative thermal expansion of the connected parts;

FIG. 5 is a plan view of the reactor unit shown in FIG. 3;

FIG. 6 is a detail view in cross section of a sealing and clamping structure for use when the tubular glass viewing member is omitted;

Figure 8:
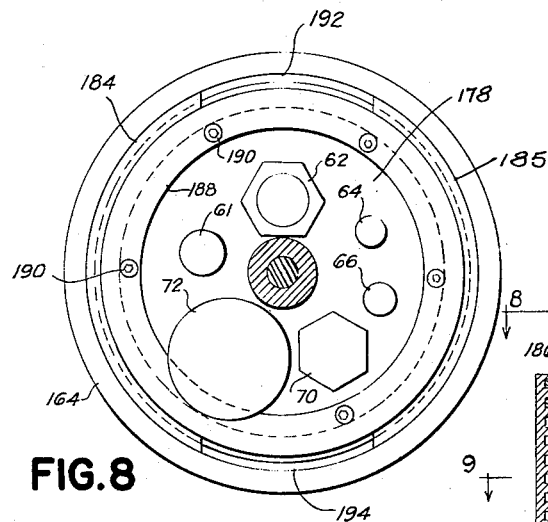
FIG. 8 is a plan view of the reactor unit shown in FIG. 7.

In general the present invention contemplates novel laboratory apparatus particularly adapted for chemical laboratory use and provides a novel metal reactor unit adapted to replace the conventional glass beaker and accessory equipment now generally used in chemical laboratories for conducting chemical experiments. The conventional glass laboratory apparatus presently in use has many disadvantages of which the following are illustrative: Heat transfer, either the addition or withdrawal of heat from material being heated or cooled in a glass vessel is difficult and unsatisfactory. The withdrawal of heat during an experiment from a glass flask reactor is practically impossible utilizing the present conventional laboratory equipment except in cases wherein the reflux principle is used. This requires the addition of large quantities of often unnecessary diluent to the reaction medium. The control of the addition of heat is likewise very often unsatisfactory. It is impossible to make use of the excellent properties of steam as a heat transfer medium in the laboratory reactors currently commercially available. This is true of even those made of metal for use in high pressure work. Glassware has low mechanical strength, is relatively fragile and easily broken. Because of its low mechanical strength laboratory experiments practiced in glassware are usually limited to atmospheric or negative pressures. The low strength of glass also limits the degree and amount of agitation that can be used. Finally, it is difficult to provide even a reasonable number of openings or nozzles in glass vessels. Because of its fragility and because of the common practice of designing glassware with relatively small openings, glass vessels are usually quite difficult to clean. Glass apparatus is by no means universal in application. Most glass vessels tend to be relatively specialized. The setting up of any new train of glass apparatus is generally quite time consuming. Glassware has certain very real advantages: Primarily it is relatively inexpensive in the smaller sizes, and it is transparent, permitting visual observation of the reaction being carried out. It is the aim of the present invention to retain the advantages of glass equipment in the novel apparatus herein disclosed and to provide additional advantages.

The prior metal laboratory apparatus commercially available also has numerous disadvantages. It is heavy, clumsy and very specialized. The designers of the commercially available metal equipment have taken no real advantage of the inherent heat transfer capabilities of metal. Generally, control of the rate of application of heat is poor, and cooling is very unsatisfactory. The bulk of the apparatus on the market is designed for pressures of many thousands of pounds, while most industrial reactions are carried out at fifty pounds or less, almost always under a few hundred pounds.

In accordance with the present invention a novel universal laboratory apparatus or experimental reactor unit is provided which incorporates the many advantages of modern metal fabrication while retaining the advantages inherent in the glass laboratory apparatus. In general the present metal reactor unit includes a cylindrical metal beaker or reactor vessel open at the top which is adapted to be removably inserted into a larger diameter outer metal container or jacket also open at the top and arranged in sealing engagement with the exterior of the mouth or flange of the inner vessel whereby to provide an annular chamber between the walls of the inner vessel and outer vessels which serves as a heating, cooling, insulating or radiation jacket. The open end of the inner vessel may be sealed by a metal closure or cover, and in accordance with one feature of the present invention the closure may be bolted, clamped or otherwise secured in sealed engagement with the mouth or flange of the inner vessel by means engageable with the outer jacket so as to leave the mouth of the inner vessel free of fastening elements. In a preferred embodiment of the invention the inner vessel is provided with a laterally extended flange at its open end, and such flange is clamped between the open end of the outer jacket and the underside of the cover. When it is desired to observe the reaction process, provision is made for inserting a heavy glass wall section between the cover and the mouth of the inner vessel, such glass section being clamped in sealed relation between the underside of the cover and the upper surface of the flange of the inner vessel.

In practice suitable inlet and outlet connections may be provided in the outer jacket for supplying or circulating suitable fluid heating or cooling mediums. Provision is also made for heating the jacket electrically by external heating units.

In accordance with another feature of the present invention a rotary agitator may be mounted in and extended through the cover, and novel variable driving means for the agitator is arranged to be conveniently moved into and out of operative engagement with the agitator shaft whereby to permit free access to assemble or disassemble the fastening elements retaining the cover in sealed engagement with the mouth of the reactor vessel. The metal cover may also be provided with a plurality of openings for various purposes, such as a rupture disk, a vapor outlet, a liquid or gas inlet, a pressure tap, thermometer or the like. In practice the various parts of the metal reactor unit preferably comprise corrosion-resistant metals or may be lined or coated with corrosion-resistant material, such as glass or ceramics.

Referring now to the drawings and particularly to FIG. 3, the present reactor unit indicated generally at 10 includes a cylindrical inner container or reactor vessel 12 supported within a larger diameter cylindrical outer container or jacket 14. The reactor vessel 12 is provided with a circumferential flange 16 at its upper end, and the underside of the flange 16 bears against the upper surface of a ring flange 18 provided at the upper end of the jacket 14. The ring flange 18 has lateral portions extended inwardly and outwardly beyond the cylindrical wall of the jacket 14 as shown. In the embodiment of the invention illustrated in FIG. 3 the bottom wall 20 of the inner vessel 12 engages the bottom wall 22 of the outer jacket 14, and an O-ring 24 is provided in the upper surface of the ring flange 18 for sealing engagement with the underside of the reactor vessel flange 16, thus sealing the annular chamber 26 defined by the outer wall of the reactor vessel 12 and the innner wall of the jacket 14 and which comprises a chamber for heating or cooling purposes.

The outer jacket 14 is supported in an outer cylindrical insulating support 28, and the jacket is also provided with a plurality of pipe connections 30, 31, 32 and 33 in communication with the annular chamber 26 and which extend through the insulating support as shown. The pipe connections may be used for various purposes in accordance with the particular use to which the reactor unit is put. Thus, the lower pipe 30 may be connected to a water inlet or to a drain; the intermediate pipe 31 may comprise a water overflow; the upper pipe 32 may be used either as a vent, a second overflow, or may be connected to a pressure gauge. Suitable valves, not shown, may be provided at each pipe connection. The pipe 33 may have a relief valve, not shown, associated therewith.

In practice the various inlet and outlet connections may be used for supplying or circulating heating or cooling fluids to the annular chamber 26 for heating or cooling vessel 12. The bottom wall 22 of the jacket may also be provided with annular electrical heating elements 35 as an alternative method of heating the contents of the reactor vessel by direct contact between the bottom wall of the vessel and the bottom wall of the jacket heated by the heating elements 35.

In the embodiment of the invention illustrated in FIG. 3 provision is made for tightly sealing the open top or mouth of the reactor vessel pressure, and provision is also made for permitting the contents of the reactor vessel to be observed during the experiment. As herein shown, a heavy walled cylindrical glass tube 36 is interposed between the upper surface of the flange 16 and the underside of a closure or cover 38. Suitable Teflon-coated gaskets 40 may be inserted between the flange 16 and the bottom edge of the glass tube, and between the top edge of the glass tube and underside of the cover 38. O-rings 42 are also provided in the upper face of the flange 16 for sealing engagement with the lower gasket 40, and in the underside of the cover 38 for sealing engagement with the upper gasket 40. Alternatively, the gaskets may be eliminated, and the O-rings may engage directly with the top and bottom edges of the glass.

Novel provision is made for detachably clamping the cover 38 and glass tube 36 in sealing engagement with the mouth or flange 16 of the reactor vessel and, as herein shown, comprises a pair of opposed semicircular or arcuate clamping members 44, 46 having radii concentric with the cylindrical reactor unit. The lower edge of each clamping member is provided with an arcuate grooved portion 48 having an upwardly and inwardly inclined face forming a hook portion 50 which is arranged to be hooked under a corresponding outwardly and downwardly inclined face formed in the lower edge of the exteriorly extended portions 52 of the ring flange 18. The upper end of each arcuate clamping member is provided with an inwardly extended arcuate flange 54 provided with spaced screws 56 arranged to engage an annular groove 58 formed in the upper face of the cover 38. As shown in FIG. 5, the opposed arcuate clamping members provide opposed open spaces 60 between the ends thereof to permit viewing of the contents of the reactor vessel through the walls of the glass tube 36. In operation the various parts of the reactor unit may be assembled, as described, and the detachable clamping members may be hooked under the ring flange of the jacket 14 and rocked inwardly to present the flanges 54 into operative clamping relation. The screws 56 may be then tightened to clamp the cover and the glass tube into pressure-tight sealing engagement with the mouth of the reactor vessel, and to clamp the flange 16 against the ring flange 18.

As herein illustrated, the cover 38 may be conveniently provided with a plurality of threaded openings for the reception of various detachable threaded fixtures and connections which may be used with advantage for different chemical investigations. Thus, as indicated in FIG. 5, the threaded openings may be provided for a nipple 61 to which a vapor line may be detachably secured; a rupture disk indicated at 62; a liquid inlet connection 64; a pressure line connection 66; a plug 70; and a thermometer 72.

As illustrated in FIG. 6, in a modified form of the invention wherein the glass viewing tube is eliminated, the flange 16 of the inner vessel 12 may be clamped between the ring flange 18 and the cover 38. In this embodiment of the invention the arcuate clamping members 75 may be similar to the clamping members 44, 46 except that they are relatively shorter in length to conform to the reduced height of the reactor unit.

Provision is also made for agitating the contents of the reactor vessel and, as herein shown, an agitator shaft 78 extends through the cover 38 and is provided at its lower end with agitator vanes 80. The shaft 78 is rotatably supported in a packing bearing which includes a hollow cylindrical bearing member 82 having a reduced diameter exteriorly threaded portion 84 at its lower end which is threadedly engaged with a central threaded opening 86 in the cover 38. O-rings 88 may be provided in the upper surface of the cover for cooperation with the underside of the shouldered portion of bearing member 82. The upper end of the hollow bearing member 82 is internally threaded to receive a packing nut 90. Packing material 92 may be placed in a center bored portion 94 of the bearing member 82, and a metal bushing 96 inserted into a central bore of the nut 90 is extended into the bore 94 above the packing material. Tightening of the nut 90 will compress the packing material to provide a pressure-tight seal around the agitator shaft 78. The agitator shaft 78 is provided at its upper end with a coupling member 98 secured thereto by a set screw 100. The upper end of the coupling member 98 is provided with an upstanding tongue portion 101 arranged to be engaged in driving relation with a grooved coupling member 102 secured to a driving shaft 104 by a set screw 106.

As illustrated in FIG. 1, the laterally engageable and disengageable tongue and groove coupling connection 101, 102 forms part of novel overhead driving mechanism indicated generally at 108, and which is adapted to be quickly and easily swung out of the way to facilitate removal of the clamping elements and disassembly of the reactor unit. As herein shown, the drive shaft 104 extends through and is secured to a drive tube 110 mounted for rotation in spaced thrust bearings 112, 114 carried by a horizontal arm 116. The arm 116 is secured to the upper end of a vertical shaft 118 by set screw 120. The lower end of the shaft 118 is reduced in diameter and is mounted for pivotal movement in a flanged bearing member 122 supported on a base plate 124 on which the reactor unit 10 is also mounted. A drive motor 126 is secured to a vertical supporting plate 128 attached to an extended portion of the arm 116. A variable speed drive connected to the motor shaft 130 includes a speed selector pulley 132 having an adjusting handle 134 and connected by a belt 136 to a pulley 138 secured to the upper end of the drive tube 110. In operation the drive shaft 104 is aligned with the agitator shaft 78 to engage the tongue and groove connection, and the driving unit may be maintained in driving position by tightening a set screw 140 provided in the bearing member 122. When a reaction process has been completed, the set screw 140 may be loosened, and the entire driving unit may be swung out of the way by virtue of the laterally disengageable driving connection, as indicated in FIG. 2, to render the reactor unit accessible for disassembly.

While the overhead drive unit has been herein illustrated and described as being movable horizontally and swung out of the way to facilitate removal of the clamping elements and disassembly of the reactor unit, it is contemplated that it can be modified to be movable vertically out of the way.

From the description thus far it will be seen that the present reactor unit provides a general purpose laboratory reactor unit which is convenient in use and efficient in operation. One of the important features of the present invention is the provision of the jacketed structure enabling the removal of heat directly through the vessel wall by the circulation of a cooling fluid through the annular chamber 26. The jacketed structure also permits a wide latitude of means for introducing heat into the vessel. In one method of introducing heat into the reactor vessel, a heat transfer medium, such as steam, Dowtherm vapor or hot oil may be introduced into or circulated through the chamber 26. In a second method the steam or Dowtherm vapor may be generated within the jacket 14 by applying heat to water or Dowtherm introduced into and sealed in the annular chamber 26. The heat may be applied to the jacket by an open flame or by the electric heating elements fixed to the jacket. Such indirect method of applying heat provides close control, and extremely uniform application of heat is possible. This is considered to be an important feature of the present invention. A third method of applying heat to the reactor vessel is by direct contact between the vessel bottom and the heated jacket bottom, as shown in FIG. 3, the jacket bottom being heated by open flame or preferably by electric heating elements. The last-named method is of advantage in that it is more adaptable to switching from heating to cooling and vice versa, and it also removes the limitation on temperature imposed by the vapor pressure of the heat transfer medium used. When using the direct contact method of heating in the unit illustrated in FIG. 3, wherein the bottom of the vessel 12 is in direct contact with the bottom wall of the jacket 14, the vessel 12 and the jacket 14 may be made from the same metal to avoid the effects of differential of expansion of the metals. However, when it is more economical or expedient to use metals having different rates of thermal expansion for the reactor vessel and the jacket, the structure shown in FIG. 4 may be used. As therein shown, the cylindrical reactor vessel 13 is provided with a straight unflanged mouth portion, and the outside diameter of the vessel, adjacent its upper end, is arranged in sealing engagement with the inside diameter of an annular flange member 142 which at its lower end bears against the ring flange 18 of the jacket 14 and is arranged in sealing engagement therewith by the O-ring 24 provided therein. An O-ring 144 is provided in the annular flange member 142 for sealing engagement with the outside diameter of the vessel 13, and an O-ring 146 in the upper surface of the member 142 is provided for sealing engagement with the lower edge of the glass viewing tube 36 as shown. Thus, a sliding expansion joint is provided between the reactor vessel and the jacket to take care of differential thermal expansion of the assembled parts which may be caused by wide temperature variations during heating and cooling of the reactor vessel.

In the embodiment of the reactor unit shown in FIG. 3 the bottom wall of the vessel 12 is in direct contact with the bottom wall of the jacket 14. However, in a modified form of the unit shown in FIG. 3 the vessel 12 may be replaced by a reactor vessel 150 of the type shown in FIG. 7 wherein the bottom of the vessel is arranged in spaced relation from the bottom of the jacket, thus extending the chamber 152 between the vessel and the jacket around the bottom of the vessel for indirect heating of the contents thereof in the manner described.

Figure 9:
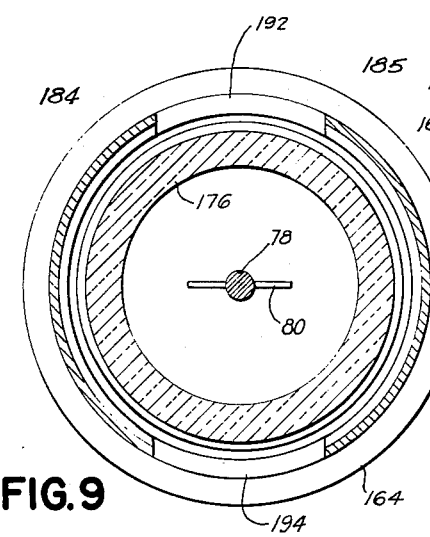
FIG. 9 is a horizontal cross section taken on the line 9—9 of FIG. 7.
Figure 7:
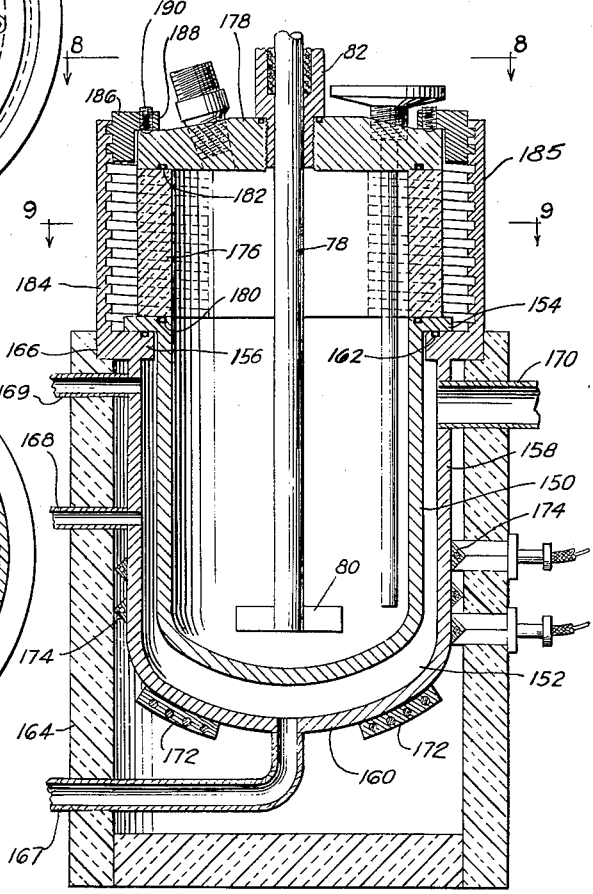
FIG. 7 is a vertical cross sectional view of a laboratory reactor unit similar to FIG. 3 and illustrating a modified structure embodying the present invention.

Referring now to FIGS. 7, 8 and 9, in the modified form of reactor unit therein shown, the inner vessel 150 is rounded at the bottom and is provided with an outwardly extended flange 154 at its upper end which bears against a flange portion 156 of an outer jacket 158 also having a rounded bottom 160 which is spaced from the bottom of the inner vessel as shown. The flange portion 156 is provided with an O-ring 162 for sealing engagement with the underside of the flange 154 to seal the chamber 152. The outer jacket 158 is supported in an outer insulating support 164, the outwardly extended portion of the flange 156 resting in a cylindrical groove 166 formed at the upper end of the support 164. The outer jacket 158 is also provided with similar inlet and outlet pipe connections 167, 168, 169 and 170 in communication with the chamber 152 for introducing or circulating heating or cooling mediums into the chamber as previously described. Electrical heating elements 172 are provided in engagement with the bottom 160 of the jacket 158, and a heating coil 174 may also be provided around the side walls of the jacket 158 as indicated in FIG. 7.

The reactor unit shown in FIG. 7 also includes a heavy walled glass tube 176 and a cover 178. The ends of the glass tube are arranged in sealing engagement with their adjacent surfaces by O-rings 180, 182 respectively. An agitator shaft 78 similar to that described extends through the cover 178, and the cover may also be provided with the threaded openings for the reception of the various fixtures and connections described. A modified structure for clamping the detachable parts of the reactor unit in pressure-tight sealing relation is shown in FIG. 7. As therein shown, the outer jacket is provided with upwardly extended opposed portions 184, 185 from the flange 156, and the extensions are internally threaded as shown. A threaded compression ring 186 screwed into the extensions 184, 185 is provided with an inwardly extended flange 188 for engagement with the cover 178 to clamp the parts in assembled relation. Clamp screws 190 may also be provided in the flange 188 for engagement with a circular groove in the cover as shown. In a further modified form of the above-described structure for holding the detachable parts in pressure-tight relation, the exterior of the extended portions 184, 185 may be threaded to cooperate with an internally threaded clamping ring having an inwardly extended flange. Further modifications of this structure may include the provision of interrupted internal threads in the extensions 184, 185 to expedite opening and closing. The provision of clamping screws 190 in the ring flange 188 are of particular advantage when the interrupted internal threads are of zero pitch. As illustrated in FIGS. 8 and 9, the ends of the walls of the extensions 184, 185 are spaced to provide opposed openings 192, 194 to permit the reaction to be observed through the glass tube 176.

Figure 10:
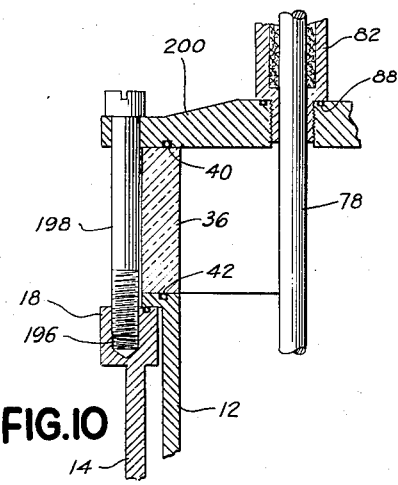
FIGS. 10 and 11 are cross sectional detail views illustrating a modified form of clamping and sealing structure shown with and without the glass viewing member respectively.
Figure 12:
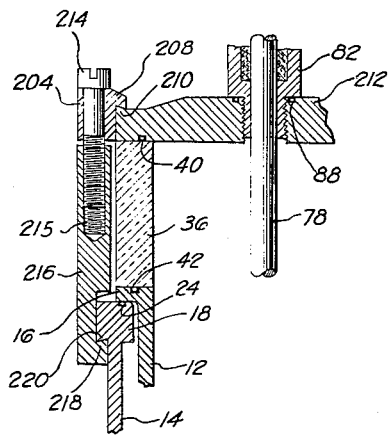
FIG. 12 is a cross sectional detail of a further modified form of clamping and sealing structure.
Figure 11:
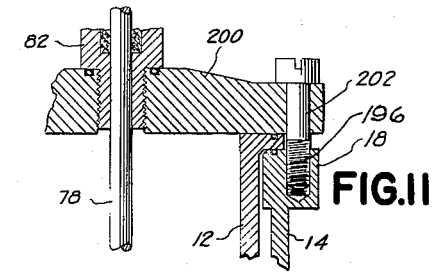

Still other modifications of means for clamping the various parts of the reactor unit together in pressure-tight sealing relation are illustrated in FIGS. 10, 11 and 12. Thus, in FIG. 10 the ring flange 18 of the outer jacket 14 may be provided with threaded openings 196 for the reception of elongated headed screws 198 extended through openings in the cover 200. FIG. 11 shows a similar embodiment without the glass viewing tube and employing relatively shorter screws 202. In FIG. 12 a modified form of clamping means includes opposed arcuate upper clamp members 204 having an internal grooved portion providing a downwardly and inwardly inclined portion 208 for cooperation with a corresponding upwardly inclined edge 210 formed in the periphery of the cover 212. Headed screws 214 extended through openings in the upper clamp 204 are engaged in threaded openings 215 formed in opposed arcuate lower clamp members 216 having upwardly inclined hook portions 218 cooperating with correspondingly inclined portions 220 formed in the underside of the ring flange 18. Thus, the upper and lower clamping members 204, 216 provide a viselike structure arranged to clamp the detachable parts of the reactor unit together in pressure-tight relation by means of the screws 214.

Figure 14:
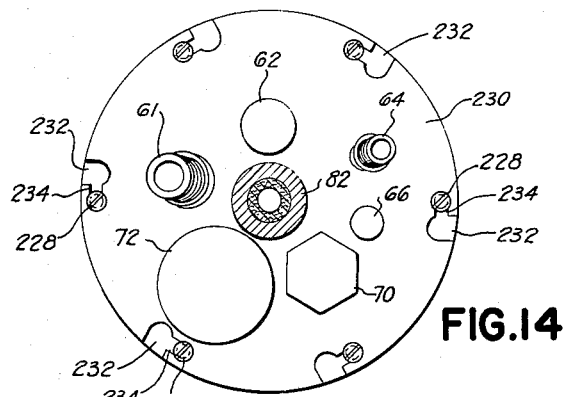
FIG. 14 is a plan view of the reactor unit shown in FIG. 13.
Figure 13:
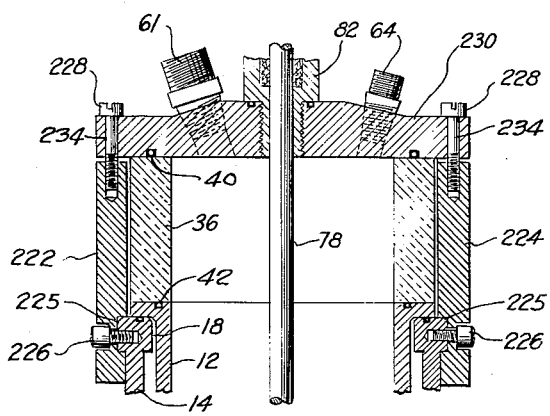
FIG. 13 is a vertical cross section of the upper portion of the present reactor unit showing another modified form of clamping and sealing structure.

Referring now to FIGS. 13 and 14, another modified structure for conveniently clamping the detachable parts of the reactor unit together in pressure-tight relation includes a pair of opposed semicylindrical or arcuate clamping members 222, 224, each having an arcuate groove 225 arranged to fit over the exterior portion of the ring flange 18 of the jacket 14 and which may be secured to the ring flange by screws 226 as illustrated. The upper ends of the clamping members 222, 224 are provided with threaded openings into which bolts 228 are inserted. The cover 230 is provided with a plurality of keyhole slots or openings having enlarged portions 232 aligned with the bolts 228 and through which the heads of the bolts may be extended in order to apply the cover 230. The cover 230 may then be rotated to bring the smaller portions 234 of the keyholes up against the shanks of the bolts and under the bolt heads. Tightening of the bolts 228 will secure the parts in assembled and pressure-tight relation. In another modification of this concept, not shown, holes large enough to clear the bolt heads may be provided in the cover, and a flat ring provided with the keyhole slots may be superimposed on the cover. In this embodiment of the clamping means only the ring need be rotated so that it is unnecessary to rotate the cover.

Figure 15:
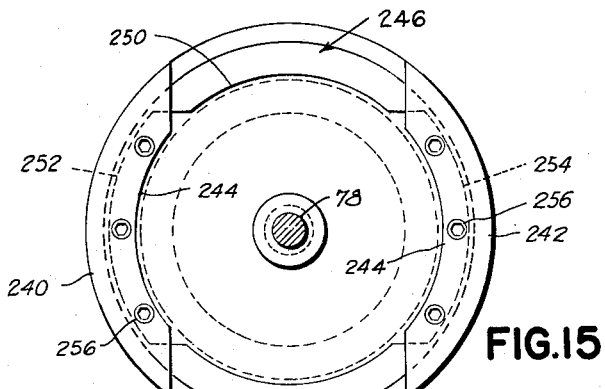
FIG. 15 is a plan view of FIG. 16.
Figure 16:
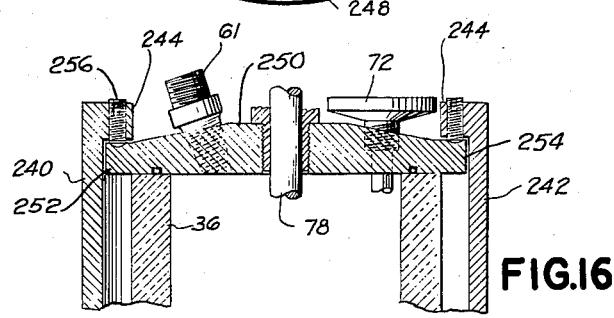
FIG. 16 is a vertical cross section of the upper portion of a reactor unit illustrating a still further modified form of clamping and sealing apparatus.

A still further embodiment of the means for clamping the detachable reactor element in pressure-tight relation is shown in FIGS. 15 and 16. As therein illustrated, opposed arcuate extensions 240, 242 of the jacket walls are provided with inwardly extended flanges 244 and are designed to provide opposed spaces 246, 248 therebetween arranged to receive a cover 250 having opposed radial extensions 252, 254. This structure provides a bayonet type joint wherein the radial extensions of the cover are inserted between the clearance spaces 246, 248 to dispose the cover in a plane below the flanges 244 whereupon the cover is rotated to dispose the extensions under the flanges. Clamp screws 256 provided in the flanges may then be screwed down to engage the cover and to clamp the parts in assembled relation.

From the above description it will be seen that the present invention provides a reactor unit which is characterized by simple and efficient structure having great versatility in use and provides efficient heat transfer and temperature control both in heating and cooling the contents of the unit. Depending upon the arrangement of the various parts, the reactor vessel and its contents may be heated by direct contact, by self-generated steam or Dowtherm or by the circulation of a heated fluid through the chamber between the vessel and jacket. The chamber may also be provided with a radioactive fluid for the purpose of irradiating the contents of the reactor vessel. The jacketed structure also permits the reactor vessel to be easily and efficiently cooled by circulation of a cooling liquid through the chamber. The jacketed chamber also provides effective insulation for the reactor vessel.

The novel design of the illustrated reactor unit contemplates the use of relatively lightweight and corrosion-resistant metals in its construction which facilitates cleaning, handling and assembly of the unit. The present design also provides relatively lightweight clamping structures capable of withstanding relatively high pressures and which may be easily and rapidly installed and removed. The particular semicylindrical shape of the clamps lends great strength, rigidity and resistance to deformation and serves to prevent lateral as well as vertical displacement of the parts when the unit is assembled in clamped relation. When relatively high temperatures and pressures are necessary in a particular reaction process the unit may be assembled without the glass observation window, and for moderate temperature and pressures the glass section may be included.

The novel design of the present reactor unit also contemplates its use as an open vat or vessel which may be accomplished by merely removing the cover and the glass section. The flange of the reactor vessel may be sealed to the ring flange of the outer jacket by clamps similar to those shown in FIG. 6 to provide an open vessel which may be easily heated and cooled through the connections to the jacketed chamber in the same manner as above described. The contents of the open vessel may be agitated through the same agitator drive as that used in the sealed unit. Alternatively, any of the aforementioned modifications of clamping means may be employed to clamp the flange of the reactor vessel to the ring flange of the outer jacket when the unit is used as an open vessel. It will be observed that the present design of agitator drive provides the thrust bearings in the drive supporting arm rather than in the cover to take the pressure exerted on the agitator shaft. One advantage of such structure is that the cover may be removed and washed without damage to the bearings. It will be further observed that the drive unit may be pivoted laterally out of the way when not in use so that the parts may be more readily disassembled and the reactor vessel removed. Also, the drive includes a tubular shaft so that when it is desired to agitate the contents of an open vessel a separate agitator shaft may be inserted into the tubular shaft to perform the stirring operation. The coupling member on the drive shaft may be replaced by a conventional chuck for holding the agitator shaft when using an open vessel. In practice the variable speed drive provides a continuous range of speeds from 440 to 1155 revolutions per minute. It may also be seen that the present novel design of reactor unit enables any form of heat to be used to heat the contents of the vessel including an open flame.

While the preferred embodiment of the invention has been herein illustrated and described, it will be understood that the invention may be embodied in other forms within the scope of the following claims.

Having thus described the invention, what is claimed is:

1. Apparatus of the character described, comprising inner and outer containers, a chamber between the walls of said containers, means for sealing said chamber including cooperating flange portions at the mouths of the inner and outer containers, a single cover overlying and projecting beyond the flange portion of the inner container, and bolts located outwardly of the flange portion of said inner container securing the cover to the outer container for clamping together the cooperating flange portions and for clamping the cover member over the mouth of the inner container to close the same.

2. Apparatus of the character described comprising an outer container and an inner container, a chamber between the walls of said containers, each of said containers having flanged mouth portions in sealing engagement with each other to close said chamber, a single cover in sealing engagement with the mouth of said inner container, and clamping means located outwardly of the flanged mouth of the inner container and being engageable with said outer container and said cover for retaining the containers and the cover in pressure-tight sealing engagement.

3. Apparatus as defined in claim 2 which includes electrical heating elements in contact with the exterior bottom wall of one of said containers.

4. Apparatus as defined in claim 2, wherein a transparent member forming an extension of the walls of said inner container is interposed in sealing engagement between the underside of said cover member and the flanged mouth of the inner container.

5. Apparatus of the character described comprising a cylindrical outer jacket having a ring flange at its open mouth portion and a cylindrical inner vessel inserted within the outer jacket, said inner vessel being of a size to provide an annular chamber between the jacket and the inner vessel, said inner vessel also being provided wtih a laterally extended flange at its open mouth portion arranged in sealing engagement with said ring flange and closing said chamber, connections in communication with said chamber adapted for the introduction or withdrawal of fluid from the chamber, a single cover in sealing engagement with the mouth of said inner vessel and clamping means comprising bolts located outwardly of the flange of the inner member and engageable with the ring flange of said jacket and with said cover for retaining the assembled elements in pressure-tight sealing engagement.

6. Apparatus as defined in claim 5 which includes a transparent viewing section forming an extension of the walls of said inner vessel interposed between and in sealing engagement with the mouth of said inner vessel and the underside of said cover.

7. Apparatus as defined in claim 5 which includes electrical heating elements in contact with said outer container.

8. Apparatus as defined in claim 5 wherein the clamping bolts are extended through openings in said cover member and are engageable in threaded openings in said ring flange.

9. Apparatus of the character described comprising an outer container and an inner container assembled one within the other, each container having a flanged open mouth portion, at least a portion of the walls of said containers being spaced apart to provide a chamber between said spaced wall portions, said chamber adapted to receive a heat exchanging medium, said inner container having flanged mouth portions in sealing engagement with the flanged mouth portions of the outer container to close said chamber, and means including a single cover member bolted to said outer container for clamping the containers together and for closing said inner container in pressure-tight sealing relation, said means including a cover overlying the mouth of the inner container and extending outwardly beyond the flange of the inner container and clamping means located outwardly of the flange of the inner container and engaging the cover and the flange of the outer container.

10. Apparatus as defined in claim 2 wherein the interior of the inner container is lined with a ceramic material.

11. Apparatus as defined in claim 9, wherein a transparent section forming an extension of the walls of said inner container is provided in sealing engagement between the bottom surface of the cover member and the mouth of the inner container.

12. Apparatus of the character described comprising outer and inner cylindrical containers providing an annular chamber between the walls of said containers, a single cover member bolted to said outer container, an annular metal member in sealing engagement with the mouth of said outer container, and a transparent annular member in sealing engagement with and interposed between said cover member and said annular metal member, the exterior of said inner container being in sealing engagement with the inner surface of said annular metal member to permit relative movement between the inner and outer containers to compensate for differential thermal expansion and contraction of the containers.

13. Apparatus of the character described comprising inner and outer cylindrical containers providing an annular chamber between the walls of said containers, a single cover member bolted to said outer container, and an annular metal member interposed between and in sealing engagement with the mouth of said outer container and the underside of said cover member, the exterior surface of said inner container being in sealing engagement with the inner surface of said annular metal member to permit relative movement between the inner and outer containers to compensate for differential thermal expansion and contraction of the containers.

References Cited by the Examiner
UNITED STATES PATENTS

| | | | |
|---|---|---|---|
| 1,456,102 | 5/1923 | Fogler | 23—259 |
| 2,165,935 | 7/1939 | Menzel | 23—290 |
| 2,627,171 | 2/1953 | Brumagim | 23—290 X |
| 2,809,136 | 10/1957 | Mortimer | 23—273 X |
| 2,828,201 | 3/1958 | Findlay | 266—33 X |
| 3,056,664 | 10/1962 | Dravnieks et al. | 23—290 |

MORRIS O. WOLK, *Primary Examiner.*

MAURICE A. BRINDISI, JAMES H. TAYMAN, JR.,
*Examiners.*